Dec. 2, 1947.  R. C. HAFERL  2,432,006
SCALE
Filed Jan. 7, 1944  3 Sheets-Sheet 1

INVENTOR.
Rolf C. Haferl
BY
ATTORNEYS

Dec. 2, 1947.    R. C. HAFERL    2,432,006
SCALE
Filed Jan. 7, 1944    3 Sheets-Sheet 2

INVENTOR.
Rolf C. Haferl
BY
ATTORNEYS

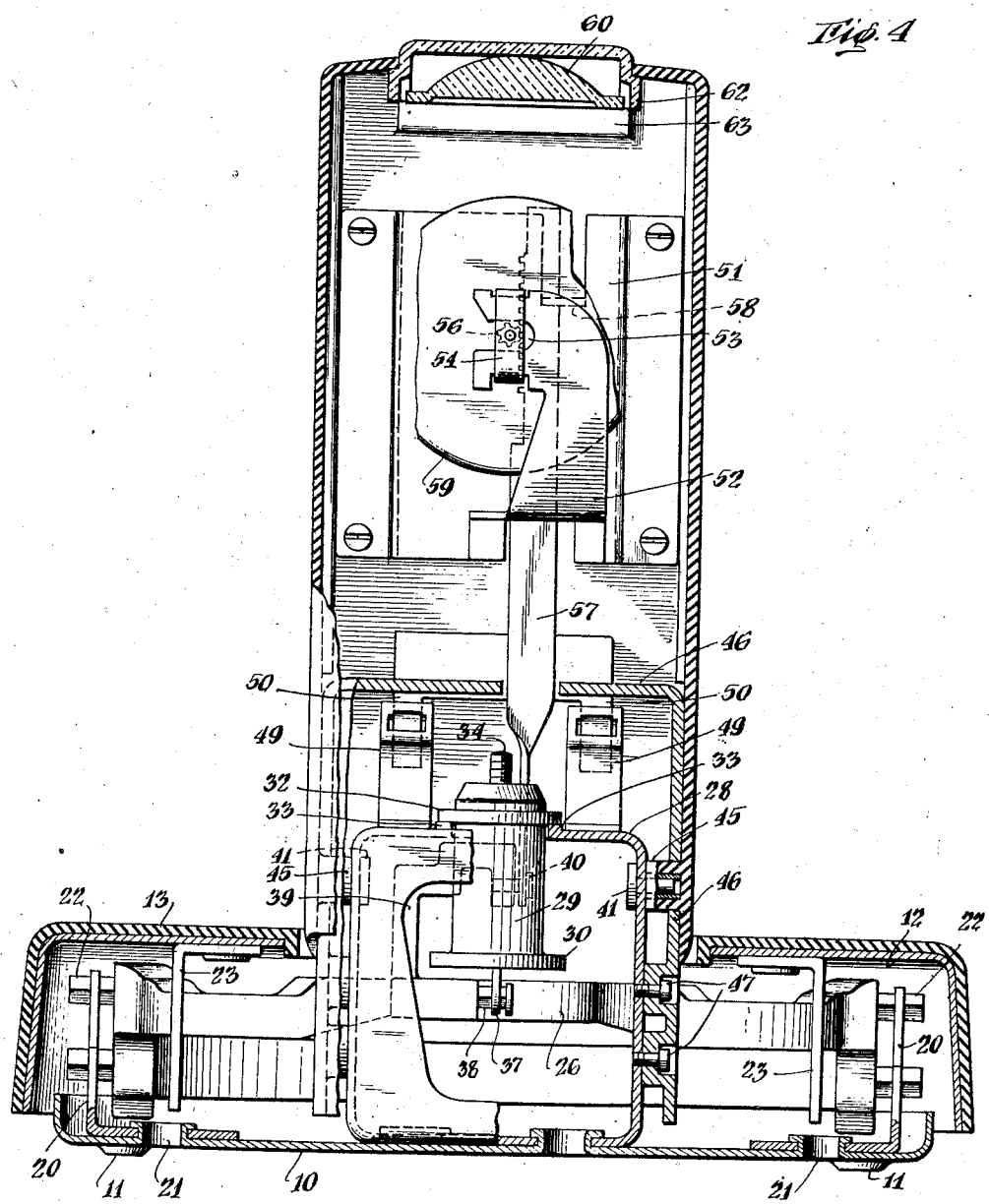

Patented Dec. 2, 1947

2,432,006

UNITED STATES PATENT OFFICE 2,432,006

SCALE

Rolf C. Haferl, New York, N. Y., assignor to The Jacobs Bros. Co., Inc., Brooklyn, N. Y., a corporation of New York Application January 7, 1944, Serial No. 517,390

7 Claims. (Cl. 265—68)

This invention relates to a structurally and functionally improved scale and in its more specific aspects aims to provide a unit of this character which will be of particular utility when used as a personal or so-called "bathroom" scale.

It is a primary object of the invention to furnish a mechanism of this type and which will be of extremely attractive appearance and capable of ready use to furnish effective and readily observable readings, aside from the fact—if used as a personal scale—that the unit will be entirely stable and properly accommodate the person desiring to be weighed.

A further object is that of providing a scale which will be of compact design and embody a construction such that it may be partially collapsed or folded so that the unit may readily be stored within a relatively confined space. At the same time, the structure will be such that when the parts are extended to their normal position of use these parts will remain in position, free from any danger of accidental shifting to a position at which an improper reading might be effected.

Another object is that of providing a scale design which will embody an improved construction of platform; such improvement being preferably incorporated in the scale structure, by means of which the results enumerated in the preceding paragraph are achieved.

An additional object is that of furnishing a unit of this type and in which a somewhat improved form of mechanical layout is present and in which, moreover, it will be possible with minimum effort to adjust the several parts of the scale to provide an accurate reading.

Still another object is that of furnishing a scale which will embody relatively few parts, each individually simple and rugged in construction, these parts being readily capable of manufacture by quantity production methods and being, moreover, capable of assembly by relatively unskilled labor to furnish an apparatus operating over long periods of time with freedom from all difficulties.

With these and other objects in mind, reference is had to the attached sheets of drawings illustrating one practical embodiment of the invention, and in which.

Figure 1:
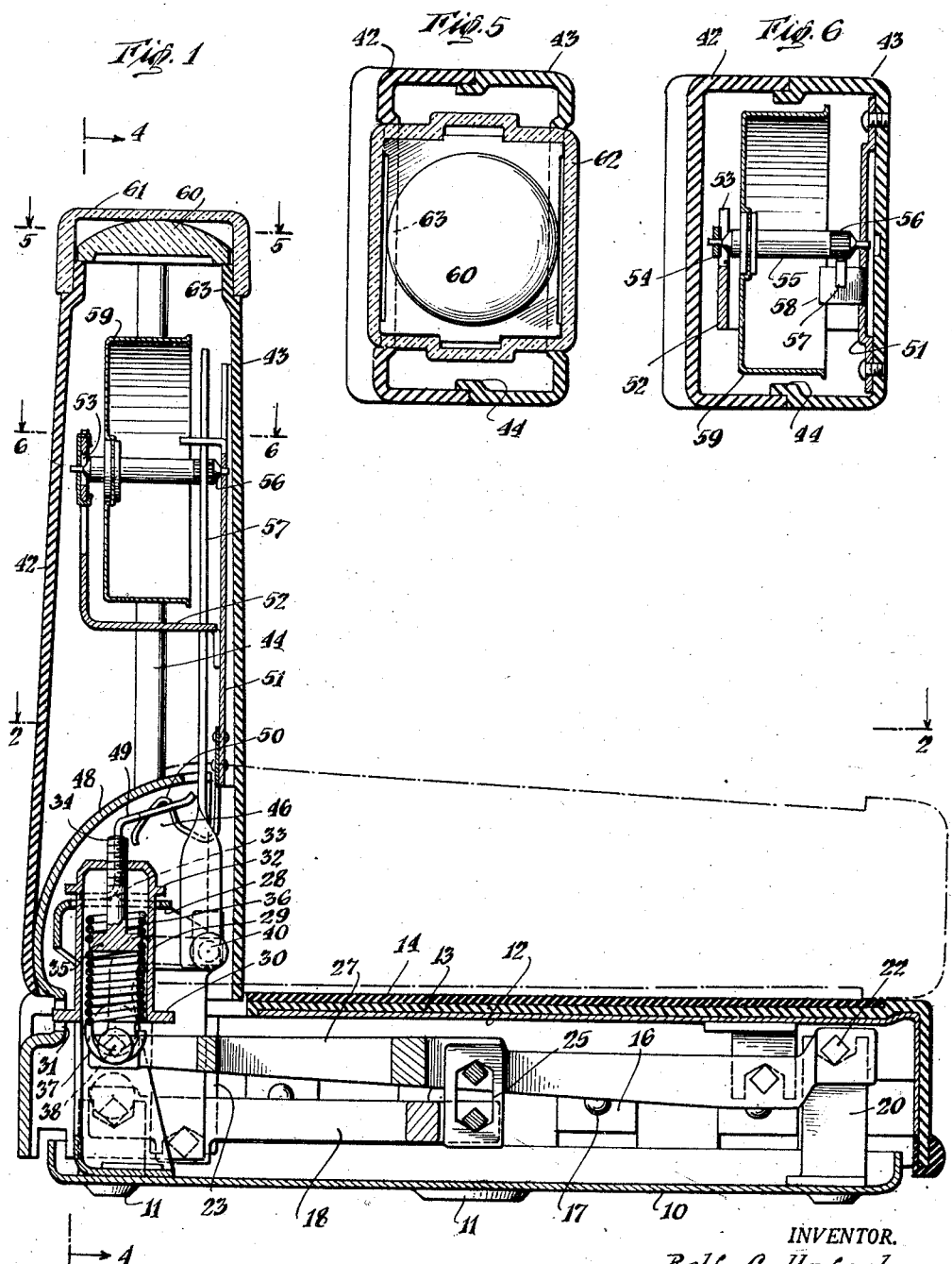
Fig. 1 is a sectional side view of a scale taken along the lines 1—1 and in the direction of the arrows as indicated in Fig. 2.

Fig. 4 is a sectional rear view taken along the lines 4—4 and in the direction of the arrows as indicated in Fig. 1; and Figs. 5 and 6 are transverse sectional views taken respectively along the lines 5—5 and 6—6 and in the direction of the arrows as also indicated in Fig. 1.

Figure 3:
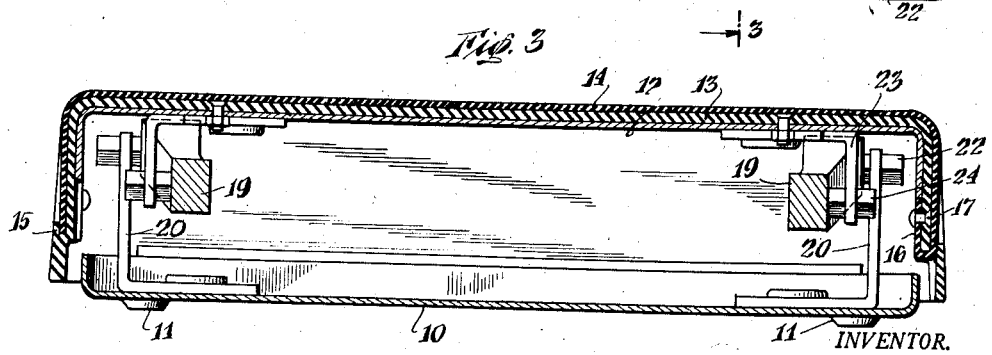
Fig. 3 is a transverse sectional view taken along the lines 3—3 and in the direction of the arrows as indicated in Fig. 2.

In these views, the reference numeral 10 indicates the base of the scale which may be in the form of a metal stamping having foot or supporting portions 11 projecting below its lower face. Disposed above the base is a platform. This may conveniently include a metal sheet or layer 12 over which a layer of material 13 is disposed. The latter layer may be formed of any suitable plastic and the two layers may be bonded or keyed with respect to each other in any desired manner. In turn disposed upon the layer 13 is a sheet 14. This may be formed of rubber or any other desirable material. Conveniently, the sheet 14 is extended over the layer 13 or its equivalent and has certain of its edge portions in the form of tongues as especially shown at 16 in Fig. 3. These extended parts are preferably projected through openings or slits formed in layer 13. Thereupon, these tongues are extended in contact with the inner face of this layer and secured in position by any suitable fastening means as indicated at 17. The portions of sheet 14 intervening the tongues are conveniently received in grooves 15 forming a part of the platform layer 13. Thus the platform assembly has its several parts secured against movements with respect to each other.

In order to mount the platform upon the base, beams are preferably employed. This assembly may include a relatively short beam 18 and a relatively long beam 19. Supports 20 formed of stampings or in any other desired manner are secured to the base as, for example, by eyeleting in the manner indicated in Fig. 4 by the reference numeral 21. These supports rockingly mount the pivots 22 of the beams. Supports 23 are affixed to the underface of the platform and rest upon pivots 24 also forming parts of the beams. These beams are preferably interconnected by means of a link 25 which may be substantially centrally disposed. The beam 19 is extended as at 26 and 27. With such extensions properly supported and the parts assembled as afore described, it is obvious that the platform will be movably supported with reference to the base.

A frame structure 28, preferably of metal, is affixed to the base 10 (again, for example, by eyelet structures) and is formed in its upper end with an opening. Extending through this opening is a tube 29, the lower end of which may terminate in an outwardly extending flange 30. The edge of this flange may be knurled or serrated. As especially shown in Fig. 1, the casing 46 may be formed of plastic and is provided with an opening 31 through which the flange extends. Adjacent its upper edge the tube 29 is formed with a further flange 32 having bearing engagement with those surfaces of the frame 28 which are disposed adjacent the upper opening of the latter. In order to reduce frictional engagement between the tube and the flange 32 so that these parts may be rotated, the frame 28 may be provided with a pair of projections 33 at this point, thus minimizing the contact area. Also this construction permits the tube to rock so that it may assume different positions under different load conditions. It will also be understood that the tube 29 may, if desired, be formed in several sections in order to permit of its association with the frame 28. If desired, however, any other suitable and substitute construction may be employed at this point.

The upper end of the tube or parts associated with the same is formed with a threaded opening. Extending into this opening is the screw-threaded stem 34 of a spring support 35. The latter mounts a spring 36, the lower end of which may terminate in a hook or supporting portion. This hook conveniently extends around a pivot 38 secured to the extension 27 of the beam 19. In this manner, the beam is normally maintained in elevated position. Consequently, beam 18 is similarly supported and both of these beams maintain the platform in proper position with respect to the base. At the same time, it will be appreciated that, if it is desired to adjust the position of the several parts, this may readily be accomplished by simply rotating the tube 29 by engaging and shifting the flange 30. Such rotation will cause the stem 34 and spring support to be shifted axially of the tube, thus elevating or lowering the end of the spring which is coupled to the beam 19.

At this time, it is to be observed that the extension 26 is preferably continued as in Fig. 4 in an upwardly projecting portion 39 which terminates at a point preferably substantially in line with the center of the scale. At this point, it mounts a pin or securing element 40 to which a rack bar is coupled. In line with the axis of this pin or its functionally equivalent connection, the frame 28 mounts supporting members or pins 41. To this end, such frame is preferably formed with round openings at these points.

Upon the mounting thus furnished, a head piece or tower is supported. The latter, as shown especially in Figs. 5 and 6, comprises a pair of identical or at least similar sections 42 and 43, one of which may mount or be formed with guiding lugs 44. These sections are retained against separation in any desired manner. This head piece mounts—in a manner hereinafter brought out—a registering mechanism and also conveniently the actuator for such mechanism. It is movably supported with reference to the frame 28 by being conveniently formed with inwardly extending hub portions 45 into which the pins 41 or their equivalents project. The casing 46 is mounted by the base 10 conveniently by utilizing bolts 47. These extend through the wall of the casing and into supporting engagement with the frame structure 28. The casing 46 may conveniently be slotted in line with the hub portions 45 so that the latter may be aligned with the pins 41. Also, as is particularly shown in Fig. 1, the rear portion of the casing may be curved as indicated at 48. With the head piece in its normal position as shown in that figure, this curved portion is concealed. However, when the head piece is swung around the pivots defined by pins 41 and hubs 45, the curved portion is exposed and provides for continuity of surface so that a pleasing appearance is presented aside from the fact that the entrance of foreign material into the mechanism is prevented.

Figure 2:
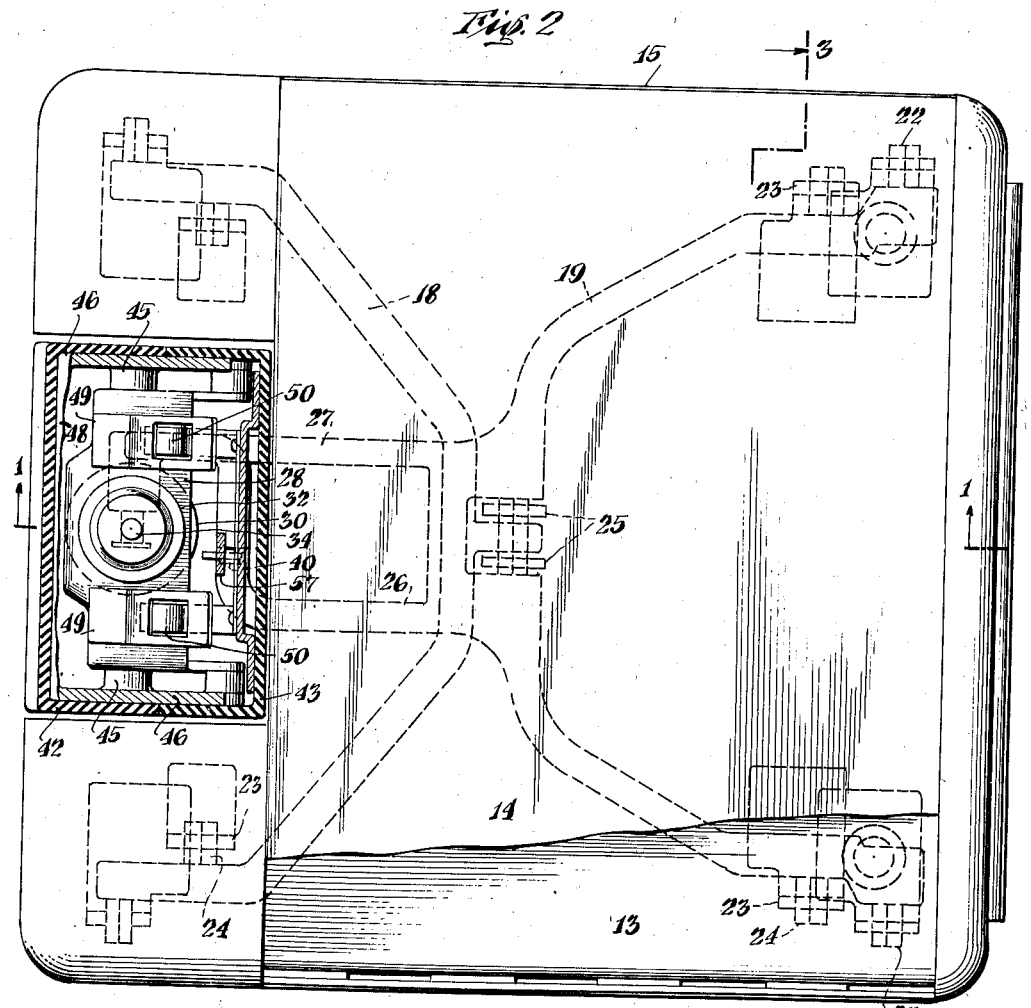
Fig. 2 is a sectional plan view taken along the lines 2—2 and in the direction of the arrows as indicated in Fig. 1.

In order to provide a structure whereby the head piece will normally be maintained in its proper position, a catch is utilized. As shown particularly in Figs. 1, 2 and 4, this catch includes cooperating parts affixed respectively to portions of the head piece or tower and the frame 28. As illustrated, these parts may include a pair of resilient strips 49 disposed one to each side of the aperture in the upper portion of the frame. Moreover, the catch includes a pair of cooperating portions also conveniently formed of spring stock and indicated by the reference numeral 50. These latter portions may be secured to a plate 51 affixed to the section 43 of the head piece. As will be observed, the strips 49 are formed with openings and the strips 50 are formed with projecting portions such that they may extend into and cam against the edges of these openings when the parts are in their normal and illustrated positions. Consequently, a detent or lock structure is furnished. At the same time, it will be apparent that the operator, by bringing deliberate pressure to bear against the outer end of the head piece or tower, may cause the projecting portions of the strips 50 to cam against the edges of the openings in the strips 49 to thus release the catch and allow the head piece to assume the position shown in dotted lines in Fig. 1.

The plate 51 mounts adjacent its upper end a bracket 52. This bracket is formed adjacent its outer end with an opening 53 conveniently capable of being covered by the body of a clip 54. The latter is formed with an opening to receive the end of a spindle 55. It is, of course, apparent that the clip 54, while normally maintained against movement with respect to the bracket will be capable of being deliberately removed when this should become necessary. In line with the opening of the clip 54, the plate 51 is formed with a corresponding opening to receive the opposite and similarly reduced end portion of the spindle 55.

This spindle is formed with a sprocket portion 56. The teeth of the latter are engaged by the teeth of a rack bar 57. Any suitable number of guides 58 may form a part of the plate 51 or its associated structures and in order to confine the movements of the rack bar 57. The end of this bar extends through an opening in the casing 46 and terminates adjacent the pin 40 to which it is connected. It follows that with the head piece in any position to which it may be adjusted, no interference of one part of the mechanism will occur with respect to the remainder of the same. This is largely because the pin or its equivalent 40 is axially aligned with the hubs 45. Thus, a common pivot point is furnished for the several parts of the mechanism and as the head piece is brought to folded or raised positions.

The spindle 55 mounts a drum 59. The latter has, upon its periphery, indicia (not shown) which will be successively displayed as the drum rotates. Such rotation will follow as a consequence of the reciprocation of the bar 57. As illustrated, the upper end of the head piece is open. Supported in line with the same is a magnifying element 60. This may conveniently be formed of "Lucite." The last described element may, in turn, be covered and suitably framed by a covering portion 61 of transparent material. As illustrated especially in Fig. 4, the covering 61 may have an enlarged section extending inwardly of the head piece as indicated at 62. This section—when the parts of the head piece are coupled—will prevent accidental detachment of the covering 61. Also, the latter will bear against flange portions 63 which may form parts of the tower and the magnifying element 60 may also rest on these parts. Consequently, the entire assembly is maintained in place and obviously the indicia upon the periphery of the drum 59 may be readily read by a person standing upon the platform.

With the parts positioned as shown, it will be understood that with a platform as illustrated and described, a person desiring to weigh himself will step upon the mat or sheet 14 covering the recessed portion of that platform. This will cause beams 18 and 19 to be depressed. Such depression will cause the spring 36 to be tensioned. As afore brought out, the latter may be adjusted so that the registering mechanism will be in an initially correct condition. As the beam assembly swings, the rack bar 57 will be lowered in its guide. As a consequence of such lowering, the spindle 55 will be rotated. This will bring into registry with the window defined by the magnifying element indicia which will register precisely the weight value upon the platform. Also, as afore brought out, the dial or head piece may readily be shifted so that an extremely compact structure is furnished; such shifting occurring without any distortion of the several parts.

From the foregoing, it will be appreciated that among others the several objects of the invention as specifically afore noted are achieved. Obviously, numerous changes in construction and rearrangements of the parts might be resorted to without departing from the spirit of the invention as defined by the claims.

I claim:

1. A scale including in combination a base, a platform movably supported upon said base, a head piece, registering mechanism within said head piece, means for operatively connecting said mechanism with said platform, said head piece being pivotally mounted with respect to said base, and a casing portion connected to said base and extending within the lower end of said head piece; said casing portion being exposed and substantially contiguous with the lower portion of said head piece as the latter is swung from a position perpendicular with respect to said base to a position substantially parallel with the latter.

2. A scale including in combination a base, a platform movably supported upon said base, a head piece, registering mechanism within said head piece, means for operatively connecting said mechanism with said platform, said head piece being pivotally mounted with respect to said base, a casing portion connected to said base and extending within the lower end of said head piece; said casing portion being exposed and substantially contiguous with the lower portion of said head piece as the latter is swung from a position perpendicular with respect to said base to a position substantially parallel with the latter, and said casing portion being formed with an opening through which access may be had to the interior of said scale.

3. A scale including in combination a base, a platform movably supported on said base, a registering mechanism, a head piece enclosing said registering mechanism, means for pivotally supporting said head piece along a substantially horizontal axis with respect to said base, whereby said head piece may be caused to assume positions substantially perpendicular with respect to said base and overlying and substantially parallel with respect to said base, and operating means extending between and connected to said platform and said registering mechanism, said last-named means including a pivot substantially axially aligned with respect to the points of pivotal support of said head piece.

4. A scale including in combination a base, a platform movably supported by said base, a registering mechanism, a pivotal support for said registering mechanism, said support extending along a substantially horizontal axis whereby said registering mechanism may be caused to assume a position substantially perpendicular with respect to said base or a position overlying and substantially parallel with respect to said base and actuating means for said mechanism including a bar mounted for reciprocation and a pivotal connection for said bar, said connection being in substantially axial alignment with the pivotal support for said registering mechanism.

5. A scale including in combination a base, a frame mounted by said base, a casing secured to said frame, a head piece, hubs forming a part of said head piece and extending through openings in said casing, pins mounted by said frame, and said pins extending into said hub portions to pivotally support said head piece.

6. A scale including in combination a base, a platform movably supported upon said base, a head piece extending from said base, said head piece including a pair of substantially identical sections providing in aggregate a tower structure, said sections being adapted to be arranged with their side edges in abutting relationship, and a transparent cover overlapping the upper ends of said sections and maintaining the same in such relationship, said tower structure having its interior visible through the body of said cover.

7. A scale including in combination a base, a platform movably supported upon said base, a head piece extending from said base, said head piece including a pair of substantially identical sections adapted to abut along their side edges to provide in aggregate a tower structure formed with an open upper end, a registering mechanism within said tower structure and operatively coupled to said platform, the indicia of said mechanism being visible through the open upper end of said tower by a person looking downwardly upon the same, an indicia-enlarging unit mounted at said open end, and a transparent cover enclosing said unit and the upper edges of the sections providing said tower whereby to maintain said sections properly disposed with respect to each other.

ROLF C. HAFERL.

REFERENCES CITED

The following references are of record in the file of this patent:

UNITED STATES PATENTS

| Number | Name | Date |
|---|---|---|
| 1,841,767 | Stimpson et al. | Jan. 19, 1932 |
| 1,879,496 | Reussenzehn | Sept. 27, 1932 |
| 2,181,272 | Greenleaf | Nov. 28, 1939 |
| 2,232,830 | Sutton | Feb. 25, 1941 |
| 1,626,963 | Osgood et al. | May 3, 1927 |
| 659,292 | Culmer | Oct. 9, 1900 |
| 1,954,207 | Hurt | Apr. 10, 1934 |
| 2,073,912 | Walker | Mar. 16, 1937 |
| 2,126,377 | Fear et al. | Aug. 9, 1938 |
| 2,311,264 | Stimpson et al. | Feb. 16, 1943 |
| 1,887,986 | Baldwin | Nov. 16, 1932 |
| 2,326,365 | Kircher | Aug. 10, 1943 |